March 28, 1967  S. I. SHAPIRO ET AL  3,311,172
ANCHOR FOR TUBINGLESS DEEP WELL PUMPING
Filed Sept. 23, 1964  2 Sheets-Sheet 2

United States Patent Office 3,311,172
Patented Mar. 28, 1967

3,311,172
ANCHOR FOR TUBINGLESS DEEP
WELL PUMPING
Solomon Iljich Shapiro and Vjacheslav Alexeevich Milovsky, both of Baku, U.S.S.R., assignors to Mashinostroitelny Zavod imeni F.E. Dzerzhinskogo, Baku, Amiradzhany, U.S.S.R.
Filed Sept. 23, 1964, Ser. No. 398,677
1 Claim. (Cl. 166—212)

The present invention relates to installations for tubingless deep well pumping using pipe stems, and more particularly, to an embodiment of an anchor, which serves to fix the pump in a casing string.

Known at present are anchors for tubingless pumping, said anchors embodying a housing with a collet clamp and an internal cylindrical section, which houses a piston being connected through hollow rods to a thrust head and spreading cone, and slips said slips used to hold the anchor on the casing string, said anchors having a considerable drawback, which is unreliable engagement of collet clamp plates with the thrust head. The lower face of the thrust head has the shape of a frustum with the apex turned down. Such a shape of the head assists in easy separation of the collet clamp plates, but fails to serve as a reliable support for the same plates when removing the anchor. This sometimes results in a breakdown requiring much repair work.

The object of the present invention is to eliminate this drawback.

The invention intends to provide such a device for anchor release, which embodies a collet clamp capable of trouble-free gripping the thrust head, when the stems are lifted, thus ensuring normal release of the anchor.

This problem can be solved by using an additional component installed between the head and the collet plates, said component assisting in easy unclamping of the collet plates, and in seating the head in the collet, said component ensuring reliable engagement of the collet, clamp with the thrust head during lifting.

For this purpose it is expedient to freely position a sliding ring between the thrust head and the collet grab plates, said ring being capable of moving along the hollow rod, by gravity, the upper and the lower faces of said rod, as well as the lower face of the thrust head having the shape of a frustum with the apex facing the inside of the head, whereas the internal and external sides of the ends of the collet clamp plates are chamfered, the internal chamfer having the angle corresponding to the angle of the frustum at the lower ring face, and the external chamber having the angle corresponding to the cone angle at the lower face of said thrust head.

Employment of the invention will reduce the number of breakdowns in the producing wells, thus increasing the oil output of this well without expenditures on repair job.

Following is the description of the invention with reference to the embodiment.

Figure 1:
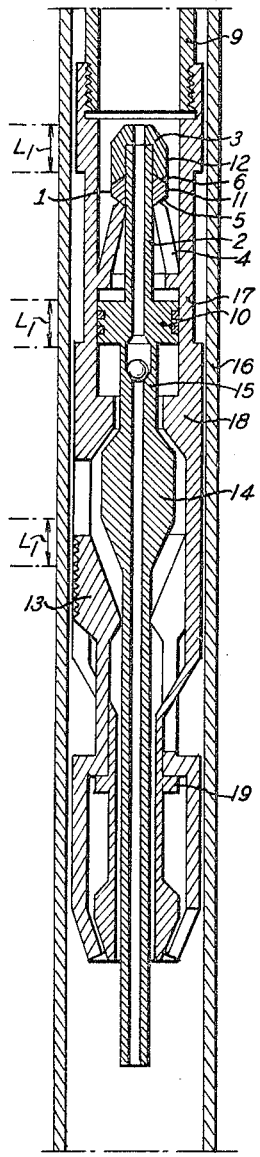
Figure 2:
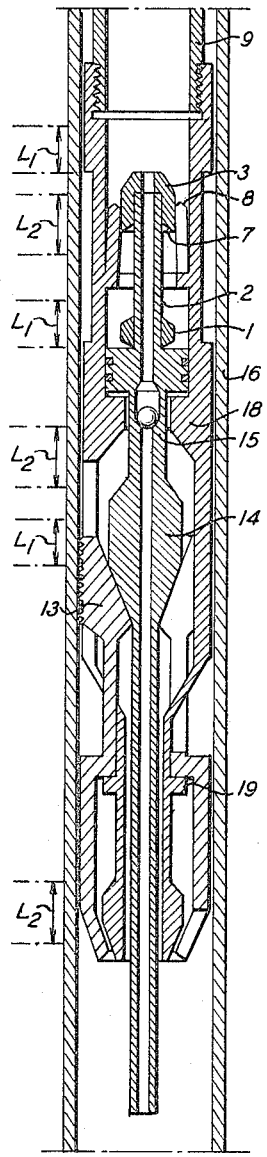
Figure 3:
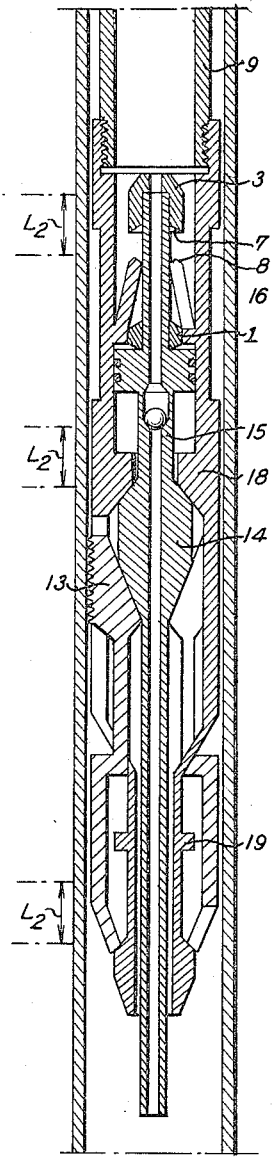
Figure 4:
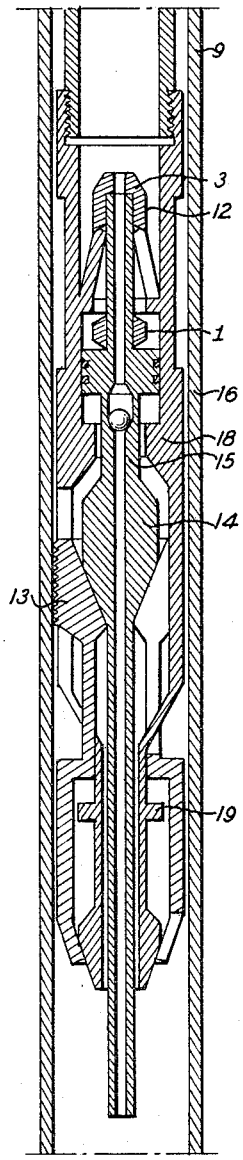
Figure 5:
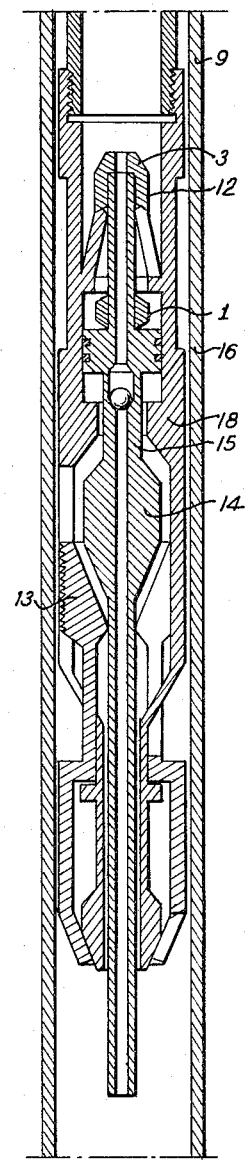
Figure 6:
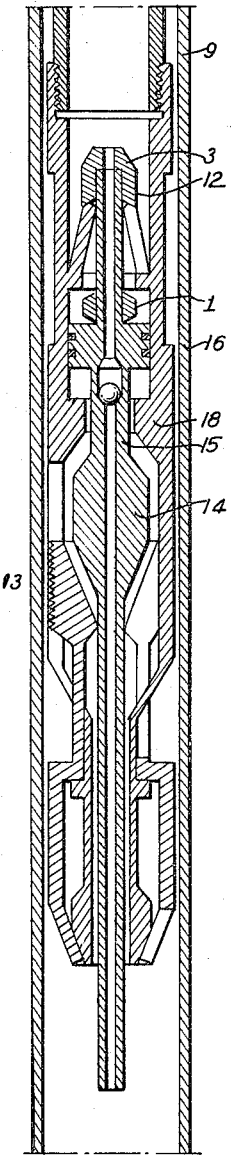

FIGS. 1–6 illustrate the anchor design in six positions: when lowering the anchor FIGS. 1–3, when lifting the anchor FIGS. 4–6.

When the anchor is lowered (FIG. 1), a ring 1 is on a hollow rod 2 between a thrust head 3 and ends of plates of a collet 4. A lower face 5 of the ring 1 conjugating with the plates of the collet 4, has the shape of a frustum, the apex of said cone facing the collet and contacting the chamfer at the internal side of the ends of the plates. An upper face 6 of the ring 1 also has the shape of a frustum, with the apex facing the thrust head 3, said face contacting a lower face 7 of the thrust head, said face 7 having the shape of a frustum with the apex facing the inside of the thrust head.

The external part of the collet plates is chamfered 8, which allows for the contact with the lower face 7 of the thrust head 3 if no ring 1 is provided.

After the anchor is run down the well on hollow stems 9 to the required depth, the stems 9 are filled up with liquid. Being forced by the hydrostatic pressure of the liquid column in the stems 9, a piston 10 with the hollow rod 2, the thrust head 3 and the ring 1 is lowered, the conic face 5 of the ring 1 spreading the plates of the collet 4. Further downstroke of the piston 10 is accompanied first by sliding of the collet plates along the external cylindrical surface 11 of the ring 1, and then along the external cylindrical surface 12 of the thrust head 3. As soon as the collet plates move from the surface 1 onto the surface 12, the ring 1 freely drops by gravity onto the upper face of the piston 10 (FIG. 2).

The piston 10 stops its downstroke after having covered distance $L_1$. At the same time the anchor slips 13, being moved apart by a spreading conical element 14 coupled with the piston 10 through a hollow rod 15, thrust upon a casing string 16 and link with the latter. After this, the hollow stems 9, with the anchor housing 17 and collet 4 attached to the latter, are lowered, the piston 10, stretching conical element 14 and thrust head 3 coupled with the hollow rods 2 and 15, keep in place. As soon as the stems 9 are lowered through value $L_2$ (FIG. 3) the lugs 18 of the housing 17 will thrust upon the upper face of the spreading conical element 14, and the plates of the collet 4 are below the thrust head 3. This position is considered to be initial for lifting the anchor.

To remove the anchor, the hollow stems 9 are to be lifted together with the housing 17 and collet 4, the external chamfers 8 of the collet plates entering the internal cone 7 of the lower face of the thrust head 3, thus gripping the latter (FIG. 4), and together with said head—the piston 10 and spreading conical element 14, thus uncoupling slips 13 from the casing string 16. With further lifting the slip 13 of the anchor is caught up by the shoulder 19 of the housing 17 (FIG. 5) starting to move together with the latter. At the same time slips 13 fully separate from the casing string 16 (FIG. 6) and the anchor moves freely upwards.

To prepare the device for the next lowering cycle the ring is brought into the initial position, as is shown in FIG. 1.

What we claim is:

An anchor for tubingless deep well pumping with the help of pipe stems, said anchor embodying a housing, with a cylindrical part, said housing being connected to the end of said pipe stems, said anchor also containing slips with the serrated operating part, said slips being used to fix the anchor in the casing string, a spreading conical element used to press said slips to the casing string, lugs on said housing, said lugs interacting with the upper face of said conical element during lowering of said pipe stems in order to use the weight of said pipe stems for reliable pressing of said slips to the casing string, a shoulder on said housing, said shoulder assisting in lifting said slips when lifting the stems during removal of the anchor out the well, a thrust head with the lower face having the shape of a frustum with its apex facing the inside of the head, a piston housed in said cylindrical part of said housing, said piston being connected to said thrust head and conical element through hollow rods, a collet clamp fixed to said housing, a ring, freely located between said thrust head and said collet clamp, said ring being capable of sliding along the hollow rod by gravity, which couples said thrust head with said piston, the upper and the lower faces of said ring having the shape of frustums, the upper face cone angle corresponding to the cone angle of said thrust head lower face and interacting with the latter during lowering of said piston, under the force of a column of liquid filling up said hollow stems, said collet clamp having chamfers at the internal and external ends of its plates, the chamber at the internal side interacting with the cone at the lower face of said ring being used to assist in moving the collet plates apart by means of the ring, when said ring is pushed by said thrust head through said collet clamp, said chamfer at the external side interacting with the cone of the lower face of said thrust head after dropping of said ring when lifting the hollow rods, thus reliably gripping said thrust head.

References Cited by the Examiner

UNITED STATES PATENTS

| | | | |
|---|---|---|---|
| 1,074,427 | 9/1913 | Frederickson | 166—216 |
| 2,350,973 | 6/1944 | Brumleu et al. | 166—212 X |
| 2,605,845 | 8/1952 | Broyles | 166—237 X |
| 2,765,853 | 10/1956 | Brown | 166—120 X |

CHARLES E. O'CONNELL, *Primary Examiner.*

ERNEST R. PURSER, *Examiner.*

D. H. BROWN *Assistant Examiner.*